April 14, 1942.                W. E. HUMPHREY                2,279,921
                           MACHINE FOR COVERING BALLS
                    Filed Sept. 16, 1939          11 Sheets-Sheet 4
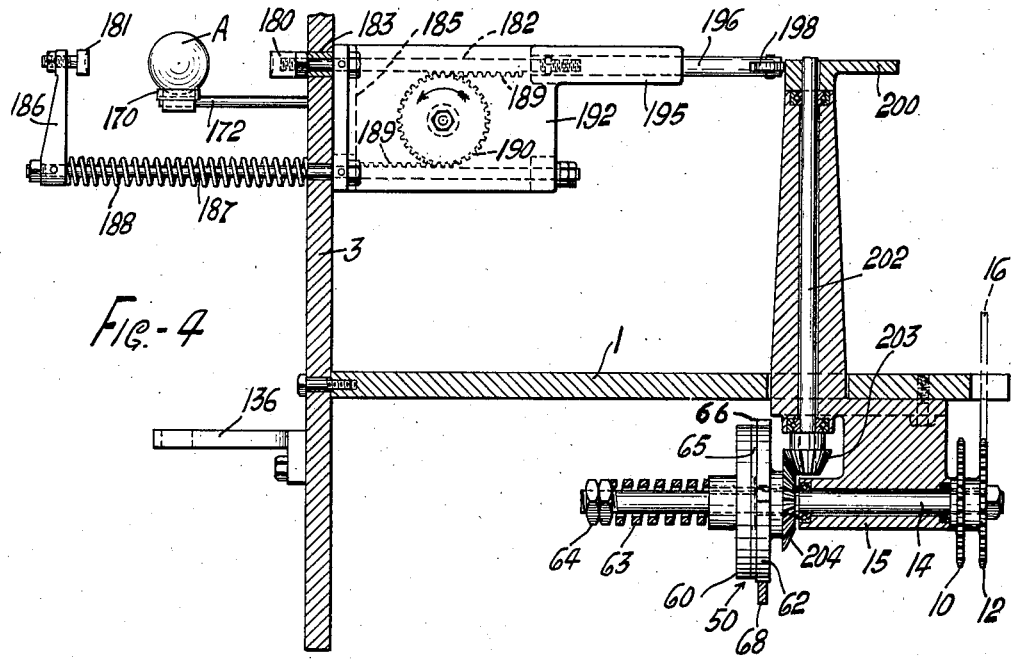
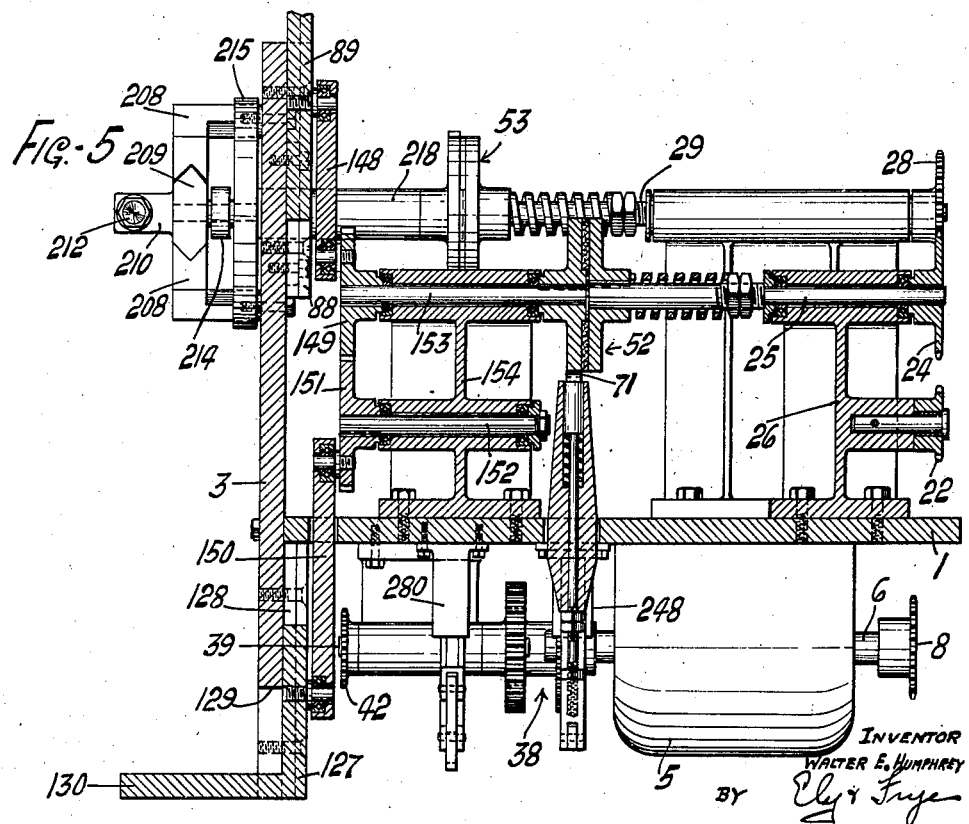
INVENTOR
WALTER E. HUMPHREY
BY
ATTORNEYS

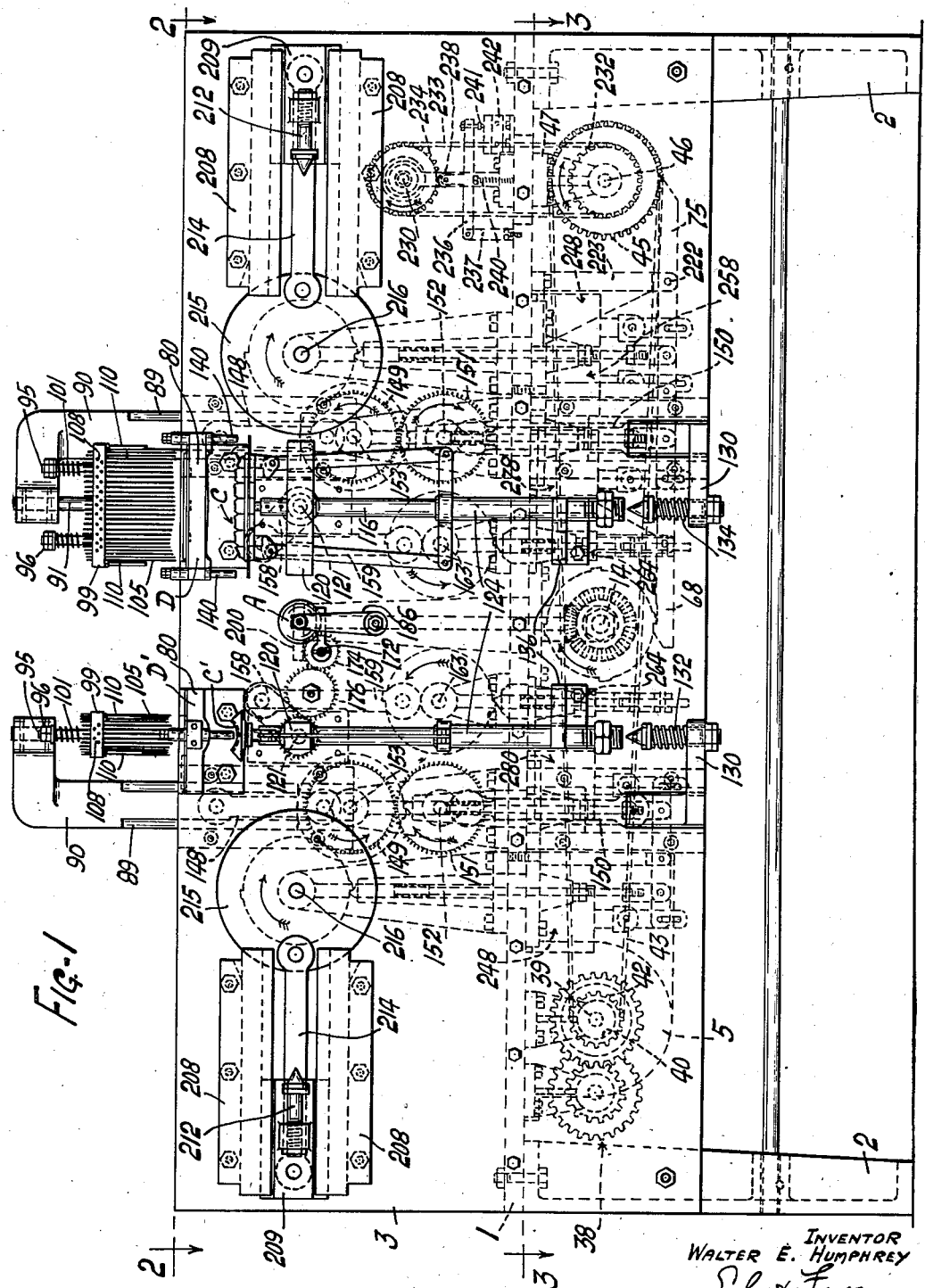

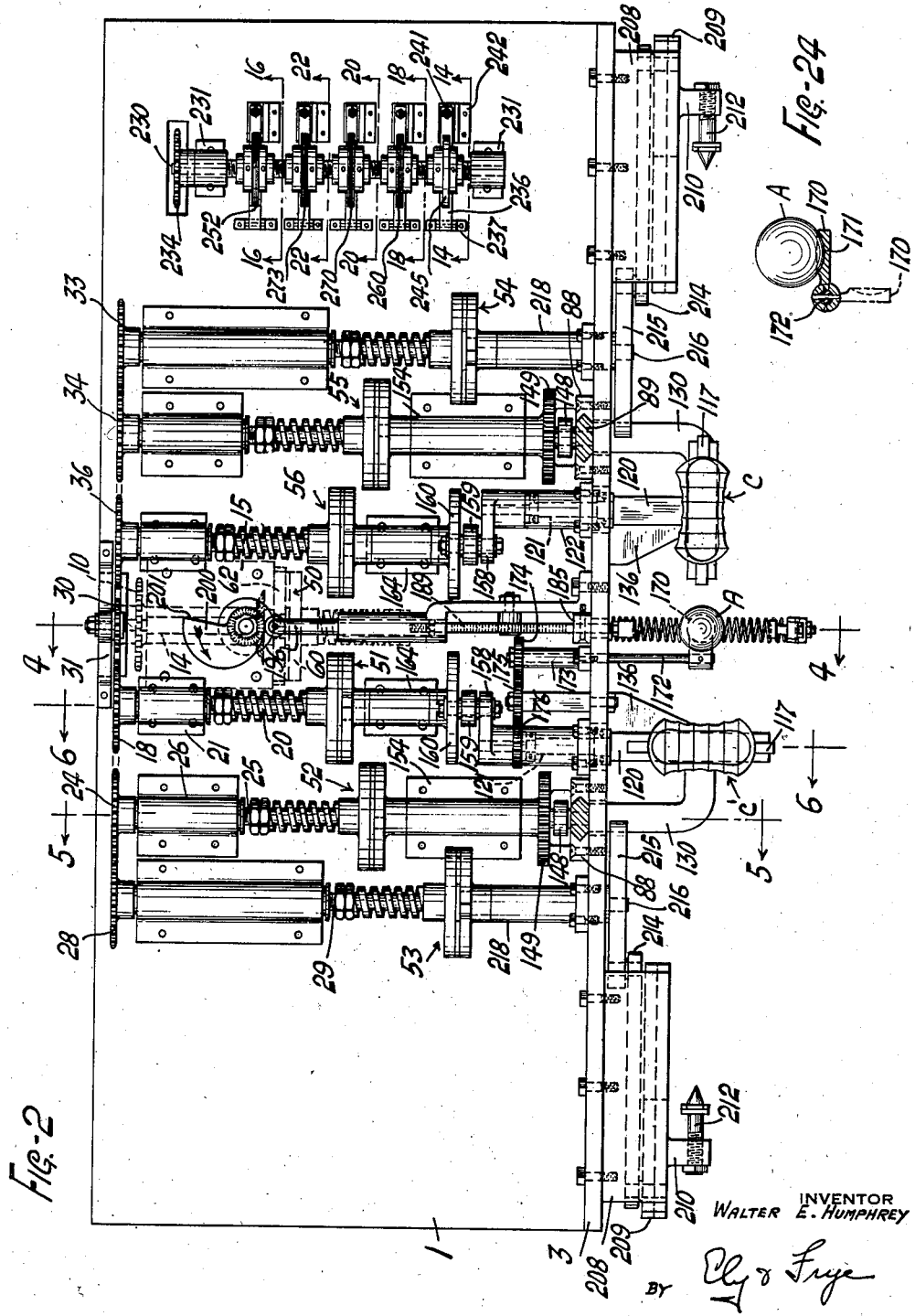

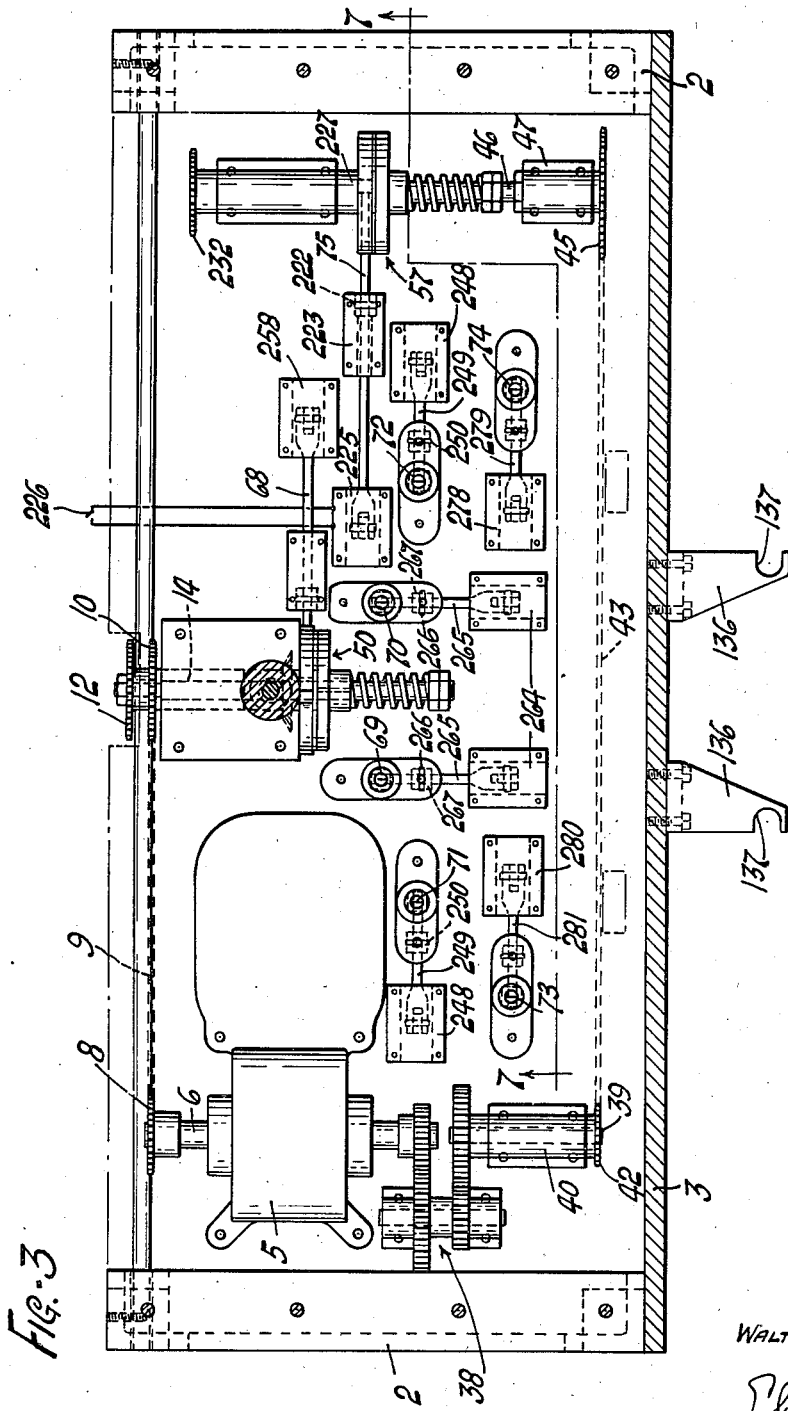

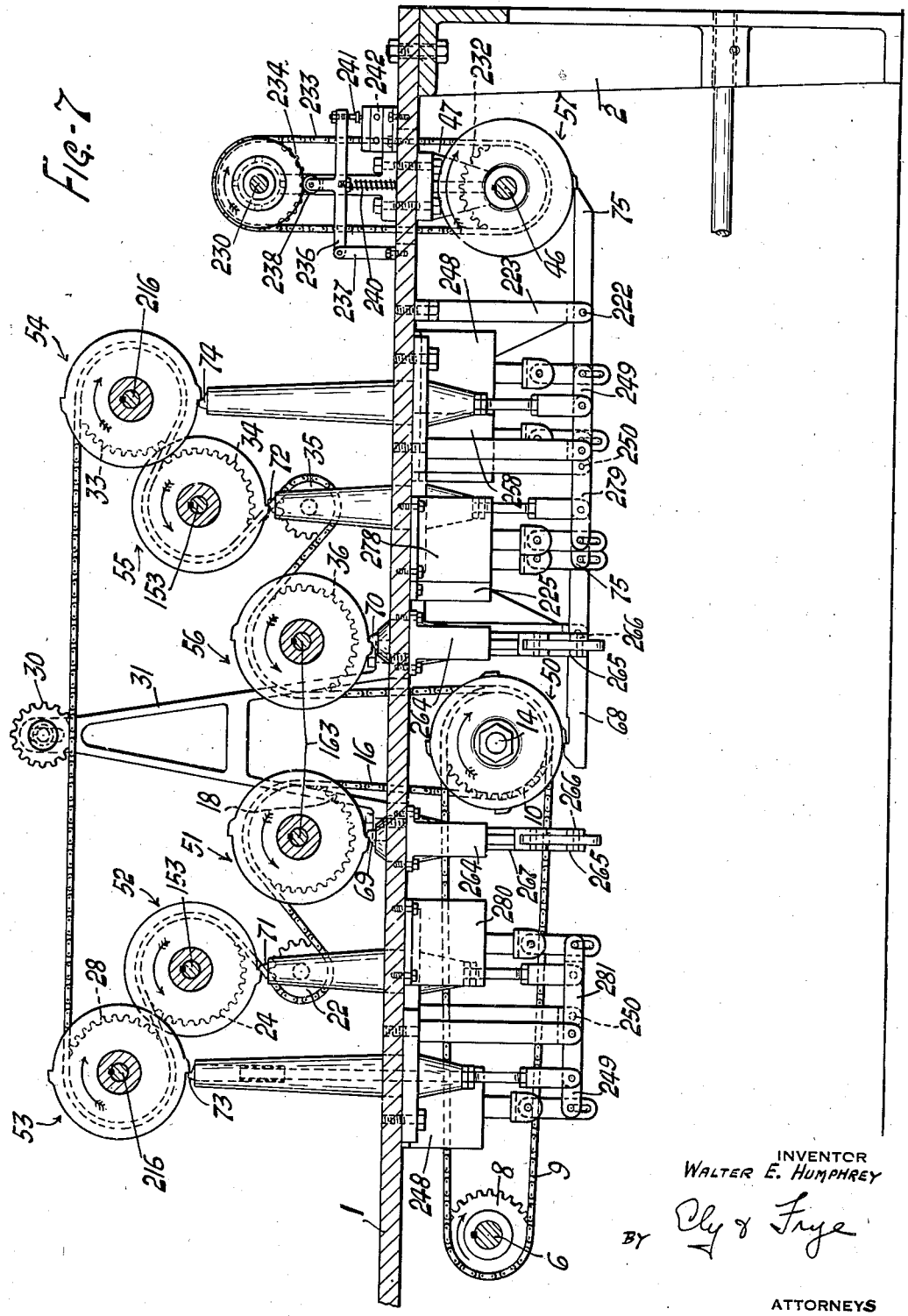

April 14, 1942.    W. E. HUMPHREY    2,279,921
MACHINE FOR COVERING BALLS
Filed Sept. 16, 1939    11 Sheets-Sheet 7

INVENTOR
WALTER E. HUMPHREY
BY
ATTORNEYS

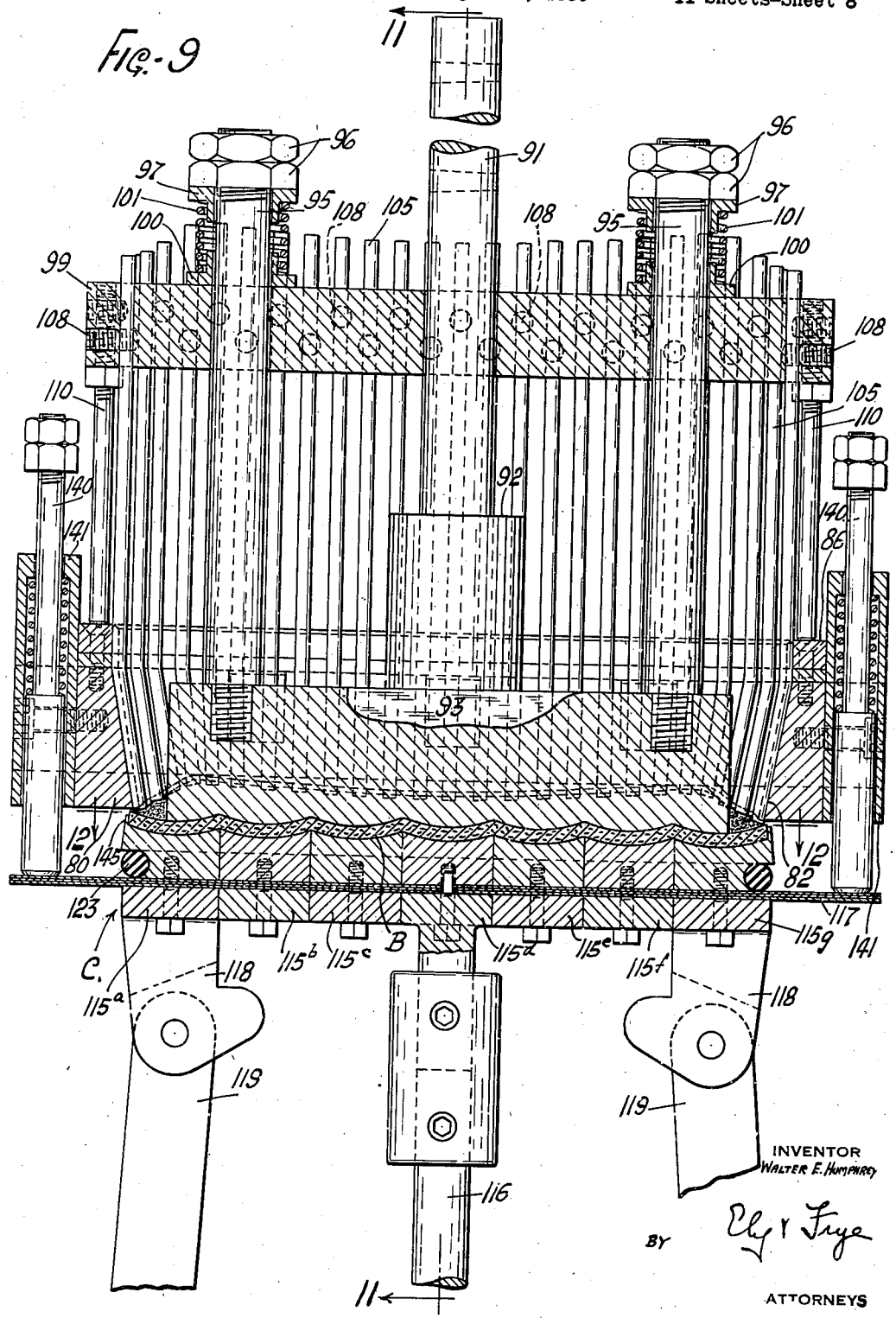

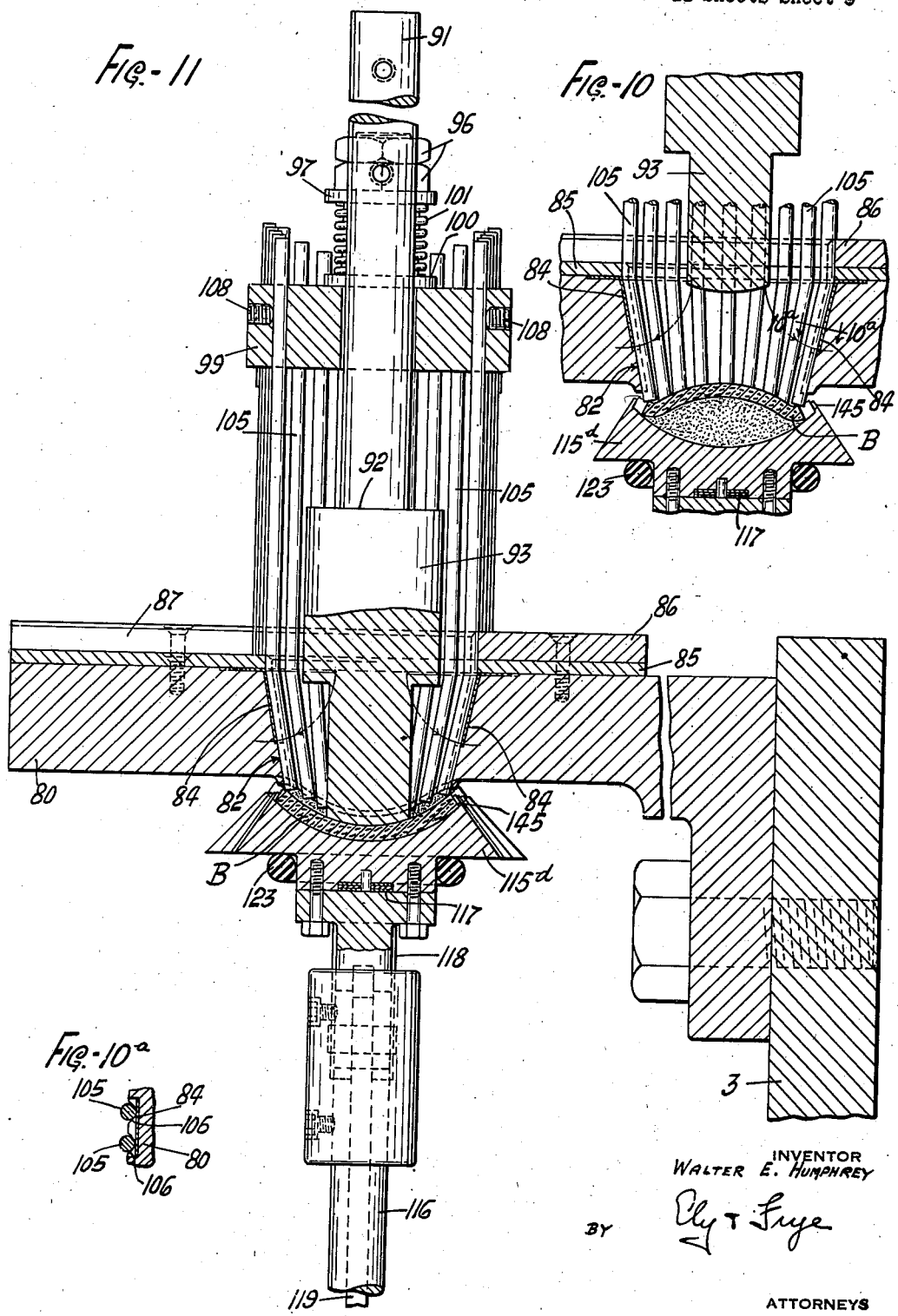

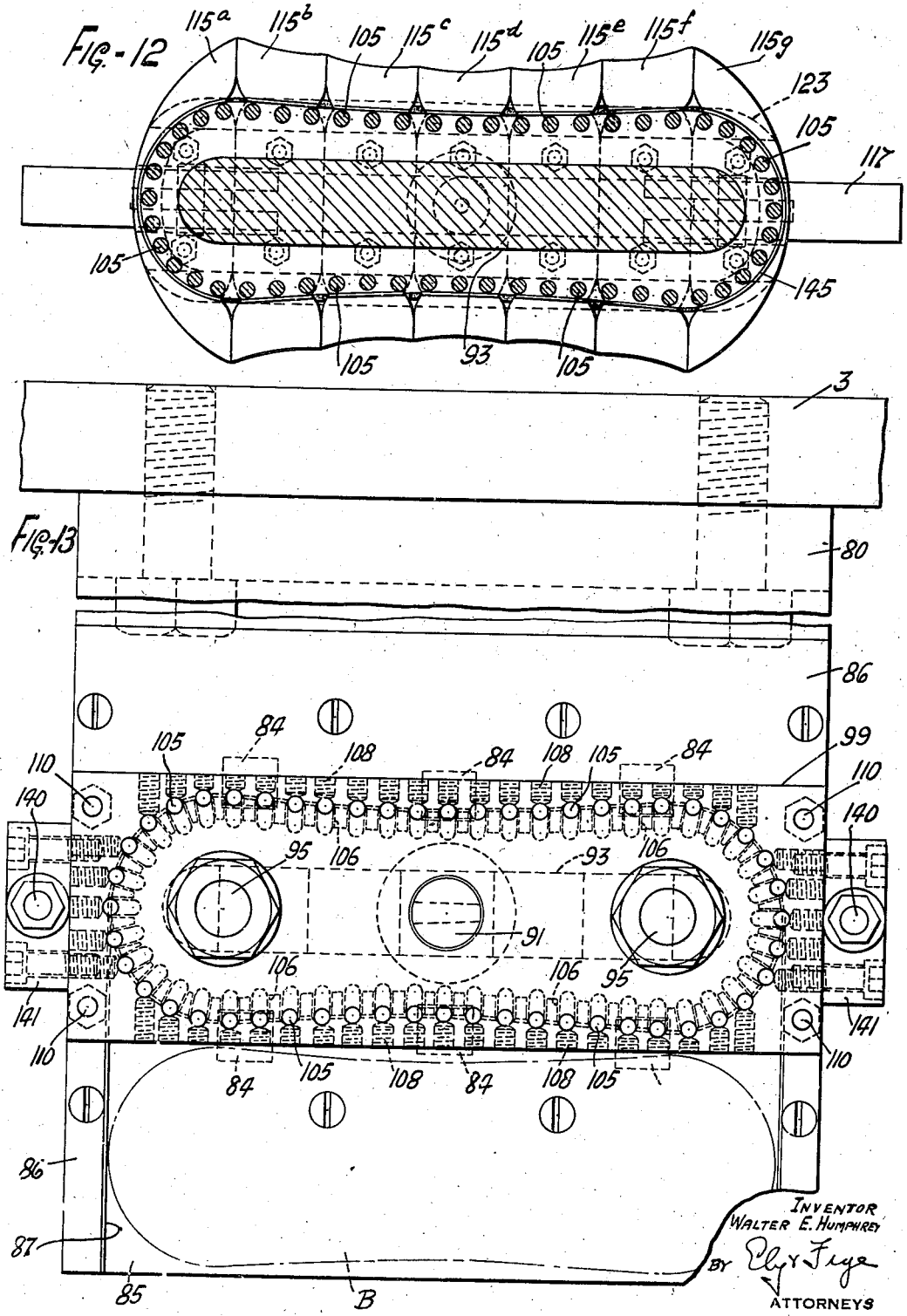

April 14, 1942.  W. E. HUMPHREY  2,279,921
MACHINE FOR COVERING BALLS
Filed Sept. 16, 1939  11 Sheets-Sheet 11

INVENTOR
WALTER E. HUMPHREY
BY Ely & Frye
ATTORNEYS

Patented Apr. 14, 1942

2,279,921

UNITED STATES PATENT OFFICE 2,279,921

MACHINE FOR COVERING BALLS

Walter E. Humphrey, Jeannette, Pa.

Application September 16, 1939, Serial No. 295,300

43 Claims. (Cl. 154—16)

The object of the present invention is to provide a machine for the covering of balls and particularly for the application of the outer felt covering to the core of a tennis ball. So far as is known to applicant, no successful machine has ever been devised for applying the felt cover to a ball of this type, the covering operations having heretofore been done wholly or principally by hand. The machine shown herein performs the covering wholly automatically and turns out a fully covered ball ready for the final set-up cure for the cement in a fraction of a minute, so that the cost of manufacture of tennis balls is greatly reduced.

The machine operation also secures further advantages in that the two 8-shaped felt sections of the usual Cassinian outline which form the outer cover are applied more uniformly than is possible by previous methods. In the application of the covers by hand, there is a tendency to overstretch one of the cover sections and to over-condense the other which results in an unevenly balanced ball. The machine is designed and operates so that the cover sections are applied equally about the ball. The sections of an unevenly applied cover will shrink to different degrees during the final set-up cure; with the operation as performed by the machine illustrated and described, the final heat treatment will react alike on both sections of the cover, eliminating the wide cracks often found between the cover sections of the old hand-applied cover.

In my prior copending application Serial No. 272,614, filed May 9, 1939, there is described and claimed the process of covering and the applicator members or "hands," per se, together with a simple operating mechanism to cause these elements to perform their operations in the required sequence. The present application is for the complete organized machine, including the applicator devices, together with mechanism for loading the applicators, for holding the ball core before the applicators act and discharging the ball, all of said parts being associated with actuating and timing mechanism to cause the several elements to act in properly timed sequence. The only duties which are required of the machine attendant are to place the ball core in position and to insert the two cover pieces in the loading mechanism, the later operation being conveniently performed while the machine is going through the covering operation. In actual operative trials of this machine shown herein, the complete cycle of operations is successfully performed in a few seconds and a more perfect covered ball is secured.

It is also an object of the invention to provide means for uniformly condensing cover sections for tennis balls.

In the manufacture of tennis balls, a pressure filled, rubber center or ball core is coated with a rubber cement which remains in tacky condition during the covering operation. The two felt cover pieces are also coated on one side with a sticky cement, and after the application of the cover, the ball is given the final cure.

It will be appreciated that the description and drawings are necessarily detailed as is desirable for a full and adequate disclosure of the best known or preferred form of the invention, but the claims are not limited to details but are intended to be of sufficient scope to cover and protect the invention in modifications, alterations and improvements falling within its scope.

In the drawings in which a successful and preferred embodiment of the invention is shown:

Fig. 1 is a front elevation of the entire machine, showing the position of its various elements at the beginning of the covering operation.

Fig. 2 is a horizontal section or plan of the machine taken on the line 2—2 of Fig. 1 at the top of the front plate, the loading plates being omitted to disclose the mechanism beneath.

Fig. 3 is a plan view immediately below the bed plate on the line 3—3 of Fig. 1.

Fig. 4 is a vertical section on the line 4—4 of Fig. 2, showing the ball core in position and the grippers or fingers which, when advanced, hold the ball in the interval after the ball support is lowered and before the "hands" or applicators reach the ball.

Fig. 5 is a section on the line 5—5 of Fig. 2 showing the actuating mechanism for the loading operation.

Fig. 7 is a vertical longitudinal section on the line 7—7 of Fig. 3 showing the driving means for the several instrumentalities of the machine and a portion of the timing unit and the several controls for the parts of the machine.

Fig. 9 is an enlarged vertical section through one of the loading units showing the position of the several parts at the completion of the loading stroke.

Fig. 10 is a transverse section through the loader just as the cover piece enters the "hand" and before the plunger flattens out the cover piece.

Fig. 10a is a detail section on the line 10a—10a of Fig. 10.

Fig. 11 is a transverse section, taken on the line 11—11 of Fig. 9, showing the elements at the end of the loading stroke.

Fig. 12 is a horizontal section on the line 12—12 of Fig. 9.

Fig. 13 is a plan view of the loading device.

Fig. 24 (Sheet 2) is a detail of the ball rest.

The completed tennis ball consists of the inflated rubber core or center indicated in the various views as A. This is coated with an adhesive rubber cement usually containing some curing agent which will set up on the final cure. The two felt cover pieces are shown at B and B', being of the usual shape and also coated with a tacky cement on the side which contacts the ball.

Figure 25:
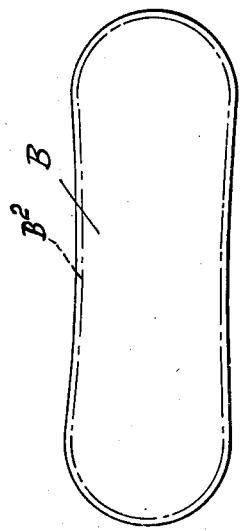
Fig. 25 is a view showing a typical cover section.

In describing the machine, the cover piece which is applied by the right hand applicator will be known as B and the one applied at the left as B'. The cover pieces are usually in aggregate area somewhat larger than the outside area of the core, it being the practice to compress the material and crowd it together when placed over the ball. As will be explained in connection with the description of the loading mechanism, the cover piece is condensed or compacted during loading and held within the applicator in the contracted condition. By providing the mechanism in the machine for compacting each cover piece, the uniform condensation of the cover and the consequent balancing of the ball are secured. The dotted line B² about the cover piece in Fig. 25 shows the degree of condensation secured, this line representing the perimeter of the recess within the "hand" or applicator.

*Brief statement of the operations*

With the machine in the position shown in Fig. 1, the operator places a prepared ball core upon the temporary ball rest in the center of the machine between the two applicators or "hands," each of which is in substantially horizontal position, but at right angles with respect to each other. This is shown in Fig. 2 where the right hand applicator C is parallel to the face of the machine and the left hand applicator C' at right angles thereto. Two of the prepared cover pieces have been placed in the right and left hand loaders D and D', which are also similarly positioned, the insertion of the cover pieces usually having been done while the machine was going through its preceding covering operation.

The operator then presses a starting button which starts the timing mechanism and the subsequent operations take place automatically until the machine returns to the position shown in Fig. 1, having delivered a fully covered ball.

The first of these operations is to load both applicators with their prepared covers. Thereupon the applicators turn through an angle of 90° so that they face the ball core in the position shown in Fig. 8, but are at right angles to each other. At the same time two grippers or fingers move toward the ball and seize and hold it until the applicators contact the ball, and just after these fingers seize the ball the temporary ball rest is moved out of the way. The two "hands," which are flexible, articulated members, then fold about the ball and make the first application of the cover. It is then desirable to tamp each section of the cover in place and for this purpose first one hand and then the other withdraws and returns to the ball, the second application of the "hand" serving to tamp and compress its cover piece in position, the edges of the "hand" acting to spread the cover pieces before they are set and thus close the gaps between the adjacent edges of the cover. In the machine as shown, the left hand side tamps first and then the right hand side. As each applicator passes about more than one-half of the ball perimeter, the ball core is always held by one or the other applicator.

When the two tamping operations have been performed, both applicators withdraw and the covered ball is released and drops into a container. It may be advisable to cause the grippers to return momentarily just before the applicators retreat at the end of the operation to seize the covered ball and prevent sticking to one of the applicators.

*The machine frame and driving mechanisms*

The frame of the machine comprises a bed plate 1 supported at sufficient distance from the floor by standards 2. Across the front of the machine and secured to the forward standards and the bed plate is the front plate 3 upon which the main operative parts of the machine are supported. On the underside of the bed plate is the main driving motor and reduction gearing housing 5 through which is driven the main driving shaft 6 to one end of which is secured the sprocket 8 which, through chain 9, drives a second sprocket 10. The sprocket 10 is fixed to a companion sprocket 12 and keyed to the shaft 14 mounted in a bracket 15 on the underside of the bed plate (see Fig 4). This shaft 14 operates the gripping fingers as will be described.

From the sprocket 12 is driven the long chain 16 which, as shown in Fig. 7, passes over the several driving sprockets and idler sprockets there illustrated to drive the operating elements of the machine. The several driven sprockets and idler sprockets and their functions will now be described.

From the sprocket 12 the chain 16 passes through the bed plate and then partly around a sprocket 18 (Fig. 6) secured to a shaft 20 mounted in bracket 21 on the top of the bed plate. This sprocket rotates the left hand applicator C' from loading to applying position.

The chain then passes about the idler 22 and thence around the sprocket 24 which is fixed to the end of the shaft 25 mounted in the standard 26 which also serves to support the idler 22. This shaft 25 actuates the applicator and the loading plunger of the left hand unit, raising the former and lowering the latter to transfer the cover piece from the loader D' to the applicator C'.

From sprocket 24 the chain passes around the sprocket 28 fixed to shaft 29 which advances the applicator C' after it is moved to horizontal position for the application of the cover section B' (Fig. 2).

From the sprocket 28 the chain passes beneath the adjustable chain tightening idler 30 mounted in the standard 31 and thence to the sprocket 33 for the right hand applicator C corresponding to the sprocket 28. The sprockets 34, 35 and 36 correspond to the sprockets 24, 22 and 18, respectively, but are for the similar elements on the right hand side of the machine. All of the driving sprockets just described have the same number of teeth, so that all of their shafts are driven at the same speed.

Referring to Fig. 3, the shaft 6 also drives, through the reduction gearing indicated at 38, a shaft 39 mounted in the bracket 40 underneath the bed plate, which shaft 39 carries a sprocket 42 driving a long chain 43 extending across the machine to a sprocket 45. Sprocket 45 is fixed to a shaft 46 carried in a bracket 47 on the underside of the bed plate, this shaft driving the timing mechanism to be described.

The several driving shafts which have been described and which operate all of the moving parts of the machine, including the timing shaft itself, drive their respective mechanisms through similar friction clutch elements. The friction clutches are numbered consecutively and a description of one will suffice for all.

The friction clutch 50 (Fig. 4), which is operated from the shaft 14, actuates the grippers or fingers for holding the ball. The friction clutch 51, which is driven from the shaft 20 and sprocket 18, performs the loading operation on the left hand unit. The friction clutch 52, which is driven from the shaft 25, controls the rotation of the left hand applicator C'. Friction clutch 53 controls the operation of advancing and retracting the applicator C' when in horizontal position and clutch 54 the applicator C on the right hand side of the machine. Friction clutch 55 corresponds on the right to clutch 52 on the left and clutch 56 on the right to clutch 51 on the left. All of the foregoing clutches are shown in their respective locations on Fig. 2.

The friction clutch 57, which is driven from the sprocket 45 and shaft 46, is located beneath the bed plate and is shown in Fig. 3. This clutch controls the operation of the timing shaft.

The several clutches are of the same general character and construction and a description of one clutch will suffice.

Referring now to the clutch 50, shown in Fig. 4, which is representative of all of the clutches, the clutch comprises a driving disk 60 which is splined upon its driving shaft 14, but is moved toward the driven disk 62, loose upon the shaft, by a heavy coil spring 63 located between the disk 60 and the adjusting nuts 64 on the end of the shaft. A friction washer or pad 65 is located between the faces of the disks. The outer rim of the driven disk 62 is provided with an appropriate number of teeth 66, (in the case of the disk 62 there are four teeth), and these teeth are adapted to be engaged by a catch on a trigger lever 68. As the trigger lever is moved away from the disk momentarily by the timing mechanism the clutch will drive the mechanism actuated thereby until the next tooth is engaged, unless, as in some cases, the trigger is held out of the path of a tooth for a sufficient interval to allow the succeeding tooth to pass the trigger.

The corresponding clutches 51 and 56 each have two teeth and are controlled by the vertically reciprocating triggers 69 and 70 (see Fig. 7). The clutches 52 and 55 each have one tooth and are controlled by the triggers 71 and 72, and the clutches 53 and 54 each have two teeth and are controlled by the triggers 73 and 74. The timing clutch 57 has a single tooth and is controlled by the trigger 75.

It will be seen that the several triggers constitute escapement mechanisms and that in each case the amount of shaft rotation, when the operation of the trigger is momentary, is controlled by the number of teeth on each clutch. But if the trigger is held out for a longer period so that a tooth passes the trigger before the latter is brought back into its initial position, a more extended rotation of the shaft will occur. In the case of the clutches 53 and 54, the respective triggers are depressed in alternation for a sufficient period to allow the left hand and then the right hand applicator to make two complete strokes as is necessary to perform the tamping operation to be described. In the case of the clutch 50, a single tooth is released when the ball is gripped before the start of the covering operation, and again as the applicators reach the ball, but at the end of the covering operation, two teeth are released to permit the grippers to seize the ball momentarily.

Each trigger is actuated by an electric solenoid which is energized at the proper timed interval by the timing mechanism, the construction and operation of which will be deferred until after the principal operative mechanisms are fully covered.

*The loading mechanism*

Figure 6:
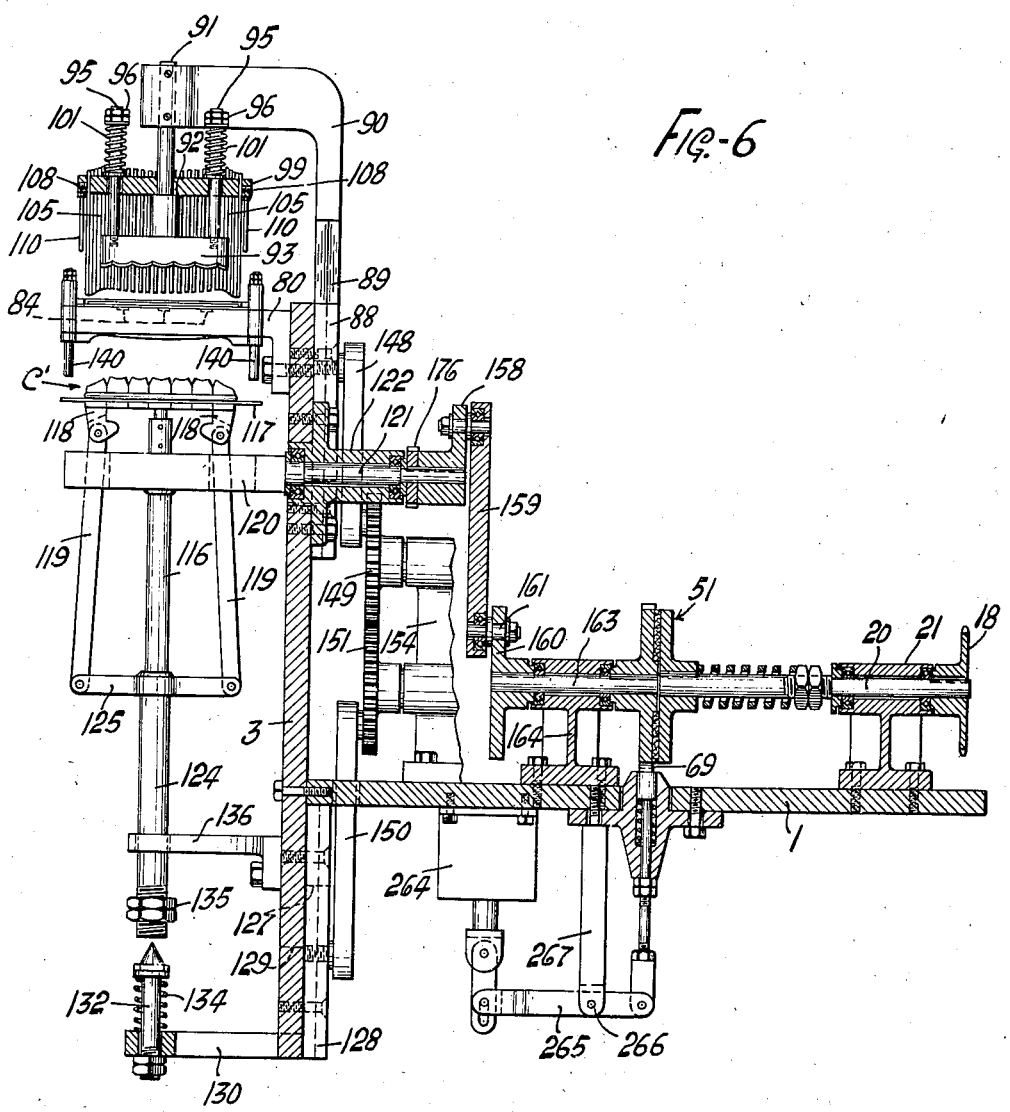
Fig. 6 is a section on the line 6—6 of Fig. 2 showing the loading device in greater detail and also the mechanism for turning the left hand applicator from the position in which it is held during the loading of the "hands" or applicators to the position at right angles thereto in which the applying of the cover takes place.
Figure 26:
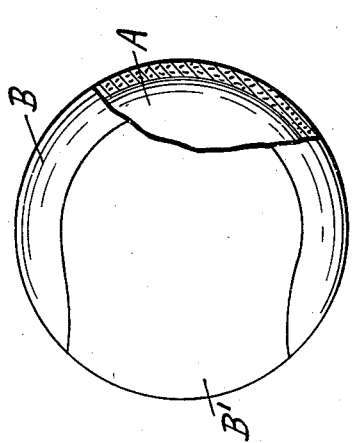
Fig. 26 is a view of a typical tennis ball.

The loaders which have been given the general reference characters D and D' are identical in construction and operation except that they are located at right angles to one another as is necessary to secure the proper position of the cover pieces with respect to the ball core, the loader D having its long axis parallel to the front plate and the loader D' having its long axis at right angles to the front plate. The description for either unit D or D' will apply equally to the other, and while the left hand loader is shown in Fig. 6 and the right hand loader in Figs. 9 to 13, the same numerals will be applied to both.

Each loader comprises a plate 80 which is secured at the top of the front plate immediately above the applicator when in vertical position. In the center of the plate is a passage or throat 82 which, as shown in Figs. 9, 10 and 11, converges downwardly from an opening a little larger than the cover piece, as outlined in full lines in Fig. 25, to a size slightly less than the line $B^2$, thus causing the uniform condensation or compression of the cover piece to which reference has been made. The dimension at the base of the throat is slightly less than the line $B^2$ so as to permit the compressed cover piece to fit within the perimeter of the "hand" or applicator.

Within recesses at the top of the plate are a plurality of flat, light, spring metal strips 84 which, when the plunger is raised, assume the elevated position shown in dotted lines in Figs. 10 and 11 to support the cover piece when inserted in the loader plate. These are held in place by a cover plate 85 which is surmounted by a guide piece 86 having a channel 87 leading to the throat of the loader plate. The operator slides the cover piece, cemented side up, onto the strips 84 through the channel 87.

Slidably mounted in ways 88 on the rear of the front plate are slides 89 to which are attached arms 90 which extend upwardly and overhang the loader plate. To the end of each arm is secured the rod 91 having a shoulder 92 and attached at its lower end to a plunger 93, the undersurface of which is undulated, as shown, to fit the face of the applicator C. From the top of the plunger are extended vertical guide rods 95, the upper ends of which carry the adjusting nuts 96 and the washer 97. Slidably mounted on rods 95 is a cross head 99 and between the washers 97 and similar washers 100 adjacent the cross head are the coil springs 101 which tend to keep the cross head on the shoulder 92, but permit it to rise when it has reached the downward limit of movement and thus permit the plunger to continue its travel for the purpose of flattening the cover piece into the "hand."

The means employed to force the cover piece through the throat 82 consists of a plurality or gang of spring rods 105 which are arranged about the cross head, as shown in Fig. 13, in a path corresponding to the outline of the cover piece as it lies upon the extended strips 84. When the arm 90 is lowered, the lower ends of the rods 105 impinge against the cover piece about its outer periphery and their joint action is to force the cover piece through the throat. It will be observed, however, that the rods 105 are partially seated in grooves 106 cut into the wall of the throat which serve to guide the plurality of rods in their passage through the throat and to prevent the lifting of the cover out of the "hand" on the return movement of the gang of rods. As the cover piece is cemented on the upper face presented to the rods, this is made to insure the freeing of the cover piece from the rods. It will also be observed that the rods, in pushing the cover piece through the throat, bend inwardly to conform to the contraction of the throat and at the same time depress the strips 84 and cause them to nest in recesses provided for their reception in the throat wall. On the return stroke the rods 105 reassume their straight condition and the strips 84 rise to receive the next cover piece.

As the lower ends of the rods should meet the face of the applicator to press the cover piece in place, the several rods are adjusted to varying heights, as shown in Figs. 6 and 9. To accomplish this purpose the individual rods are held in position by set screws 108 which are located in the cross head and bear against the rods.

In order to limit the downward movement of the cross head, adjustable pins 110 are mounted at the corners of each cross head and strike the upper side of the loading plate 80 at the downward limit of travel.

To describe properly the operation of loading, it is necessary to give some description of the applicators or hands, but, as stated, these members are described and claimed more fully in the copending application Serial No. 272,614.

The applicator or hand consists of a plurality of articulated sections, each having its upper face shaped to correspond with a certain sector of the ball surface, the total area of the sections being equal to the area of one of the cover sections. When the applicator is to receive the cover section, it is substantially flat, but when moved toward the ball core it folds or wraps around the core, applying its cover section thereto. As each applicator is equal in area to a cover section, the two applicators completely surround the ball during the covering operation.

Each applicator is shown herein as consisting of seven sections which are numbered 115a, b, c, d, e, f and g from left to right as shown in Fig. 9. The center section 115d is secured to the upper end of a carrying arm 116, while the outer sections 115a and 115g are attached to lugs 118 to each of which is pivoted the operating lever 119. Except for the central section which is pinned thereto, the several sections are slidably mounted upon a heavy leaf spring 117 which permits the sections to fold about the ball. A heavy rubber stricture band 123 surrounds the sections and holds them together while permitting the spreading as the sections wrap about the ball. The carrying arm 116 is slidably mounted in a plate 120 on the end of a shaft 121 rotatable in a sleeve 122 carried upon the front plate 3. For a detailed description of the operating mechanism for moving the applicator, reference is made to the copending application, it being sufficient for the present purposes to state that the arm 116 is received in the reciprocating sleeve 124, the upper end of which carries the cross arm 125 to which the operating levers 119 are pivoted. As the sleeve 124 is moved upwardly, as shown in Fig. 6, the entire unit is moved until the arm 116 reaches a stop. This is as far as the unit is moved for the loading. When the unit is to apply the cover, the sleeve moves forwardly to a greater extent, causing the cross arm 125 to move along the arm 116, this movement causing the sections to wrap about the ball.

In order to cause the upward movement of the applicator unit to loading position, there is provided for each applicator a slide 127 on the rear of the front plate, each slide moving in guideways 128 (Fig. 5). From the lower end of each slide and projecting through a slot 129 in the front plate is an angular bracket 130 on the outer end of which is carried an operating pin 132 slidably mounted therein and held up by a spring 134. The upper end of the pin is cone-shaped so that it will enter the open lower end of the sleeve 124 when the slide 128 is raised. On the lower end of the sleeve are the adjustable stop nuts 135 which, at the upper limit of movement, strike the underside of the bracket 136 carried on the front plate. This bracket has a recess 137 to receive the tube when brought to vertical position, but permits the applicator to rotate from the vertical loading position to horizontal applying position.

The ends of the spring 117 are projected outwardly so that the spring strikes spring-pressed stop pins 140 mounted in housings 141 on the side of the loading plate 80 at the upper limit of travel of the applicator. These pins 140 insure that the applicator will be flat when it is presented to the loading plate so that the cover piece will be received therein in flat condition.

It will be observed that on the outer edges of each section of the applicator is the thin wall or upstanding margin 145. These margins define the line B² about the cover piece and form a pocket to receive and hold the cover piece until it is applied to the ball core, and as the wall overhangs the pocket, the cover piece is securely held in position until it is released by adherence to the ball core. By reference to Fig. 10, it will be seen that the composite margin formed by the walls above the applicator is slightly greater than the discharge end of the throat 82, so that when the cover piece is forced out of the loading plate it will surely enter the pocket on the applicator and will not be caught on the marginal wall. This also gives a slight excess space to receive the cover piece so that it will be better fitted therein when the plunger flattens it out.

In the loading operation, the cover piece being in place, the plunger and the cross head with its spring rods 105 move downwardly to force the cover piece through the loader plate and at the same time the applicator moves upwardly to the position shown in Figs. 10 and 11 to receive it. In order to do this, the arm 90 moves down and at the same time the slide 127 moves up until the pin 132 enters the sleeve 124, whereupon the applicator unit moves upwardly until the loading position is reached as governed by the location of the nuts 135, the spring 134 permitting a slight over movement of the slide 127. As the cover piece passes through the throat and into the pocket on the applicator by the action of the rods 105, it tends to bow upwardly, as shown in Fig. 10. When the rods 105 have reached their lowermost position, their cross head will stop, but the plunger 93 will continue to move downwardly until its lower face presses against the cover piece on the applicator, which action will remove the upward bow in the cover piece and flatten it out into the applicator.

The mechanism for moving the plunger and the applicator jointly is shown in Figs. 5 and 6. To the slide 89 is attached the link 148, the other end of which is pivoted to the face of the gear 149. To the slide 127 is attached the link 150 which is pivoted at the other end to the gear 151, these gears being of the same size and intermeshed so that the slides advance and retreat in unison. The gear 149 is carried upon the shaft 153 rotated in the standard 154 rising from the bed plate and also supporting the shaft 152 for the gear 151. The shaft 153 is attached to the driven member of the clutch 52 (or 55). These clutches are brought into action by the movement of the triggers 71 and 72, and as each clutch disk has one tooth only, the release of the clutches will cause one complete revolution of the shaft 153 which causes the plunger and its associated parts and the applicator to advance and recede from the loading plate, the result being that the cover piece is transferred to the applicator which, at the end of the movement, is brought back to the position shown in Fig. 1 and ready for rotation to horizontal or applying position.

In order to complete the description of this part of the mechanism, the means for rotating the applicators from their loading position to the applying position should be given. It will be recalled that each plate 120, which carries the applicator, is supported on the shaft 121 (Fig. 6). The end of this shaft is fixed to a crank 158 which is actuated by link 159 extending to the disk 160 and pivoted at 161. Disk 160 is fixed to the end of the shaft 163 carried in bracket 164 mounted on the bed plate and is attached to the driven member of the clutch 51 (or 56).

It will be recalled that these clutches are provided with two oppositely placed teeth so that as the triggers 69 and 70 are released, the shaft rotates 180° at each operation, this action turning the applicator from vertical to horizontal position where it remains until the applying of the cover is completed, whereupon the clutch is again released for a one-half rotation which brings the applicator back to horizontal position for the next loading.

It will be observed that while the rotation of the shaft 163 is always in one direction and is in intervals of 180°, the turning of the applicator is through an arc of 90° only and is in reverse direction. This is due to the fact that the shaft 121 is not in vertical alignment with shaft 163, as would appear from Fig. 6, but is at one side thereof, as shown in Fig. 1, the stroke of the link 159 turning the applicator through the requisite 90° in reverse directions.

*Ball core supporting and gripping mechanism*

The prepared ball core A is placed in the machine by the operator upon a ball core support 170 located between the two applicator units and in such position that its center is in alignment with the center of the shafts 121 about which the applicators rotate.

This support (see Figs. 1, 2 and 24) is a plate having a cavity 171 to receive the ball. The plate is mounted upon the end of a shaft 172 mounted in a bearing 173 on the rear of the front plate and is fixed to a pinion 174 meshing with an idler pinion 175 driven by pinion 176 fixed to the shaft 121 immediately in front of the crank 158. The construction is such that as the applicators turn from their loading to their applying position, the core support is moved downwardly into the dotted line position of Fig. 24 out of the path of the left hand applicator C'.

As the operation just described takes place before the applicators reach the ball, it is necessary to hold the ball at points which are not contacted by the applicators at the moment of their contact with the ball core.

This operation is performed by two grippers which are constructed so that they move into gripping relation with the ball core just before the core support moves downwardly, hold the ball until the applicators have contacted with it and start their enfolding movement, and then retreat to clear the applicators. It has been found advisable to momentarily return the grippers to hold the ball just as the applicators are opening up after the conclusion of the covering and tamping operations, so that, as the applicators are withdrawn, any tendency to adhere to either one is overcome. After the covered ball has been released by the applicators, the grippers will return to their open position and the covered ball will drop out of the machine.

Figure 8:
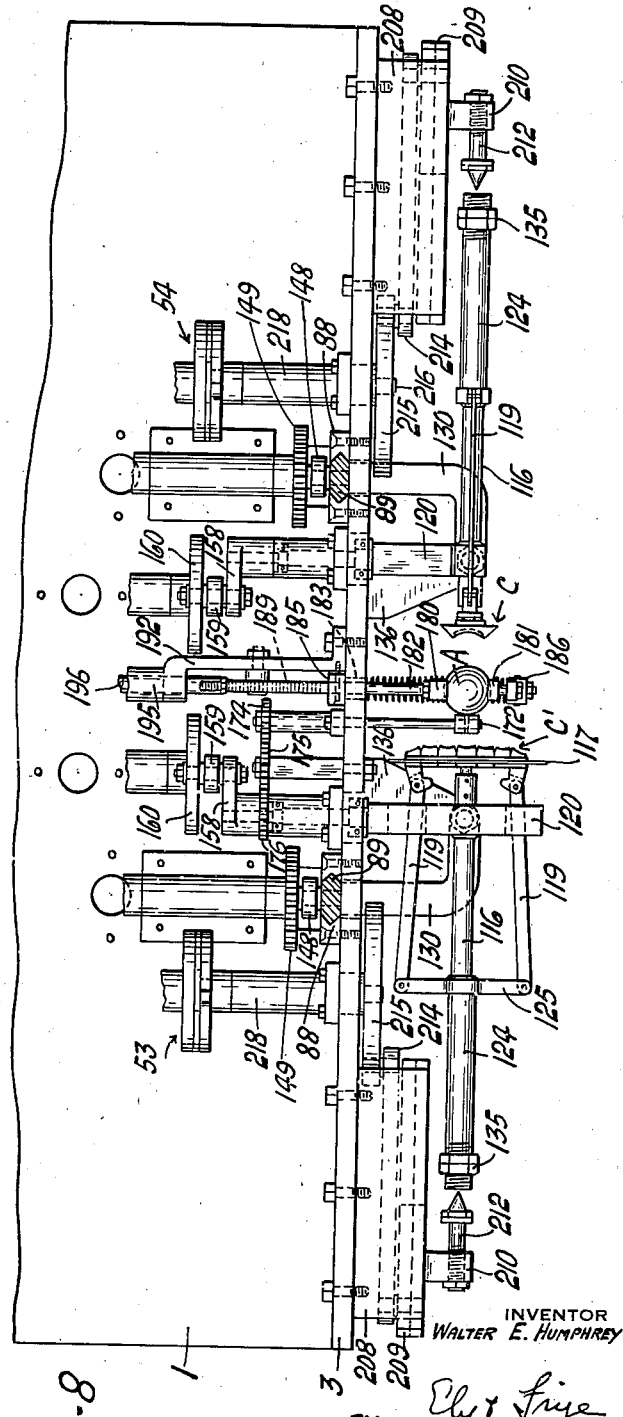
Fig. 8 is a view of the forward part of the machine, similar to Fig. 2, but showing the "hands" in horizontal position just prior to the inward movement, the ball core being held by the grippers.

The grippers are shown in open position in Figs. 2 and 4 and in closed position, gripping the ball, in Fig. 8.

The two grippers are indicated by the numerals 180 and 181, the adjacent faces being recessed to fit the curvature of the ball. Gripper 180 is adjustably fixed on the end of a bar or arm 182 which is slidably mounted in a rubber bushing 183 held in place in the front plate 3 by a backing plate 185 and serves to cushion the return movement of the grippers. Gripper 181 is adjustably mounted on the end of vertical arm 186 which is secured to the bar 187 slidably mounted in the front plate below the arm 182. Surrounding the bar 187 between arm 186 and the front plate is the spring 188. The facing surfaces of the bars 182 and 187 at the rear of the front plate are formed as racks 189 engaging the gear 190 mounted upon a bracket 192 secured to the rear of the front plate. At its rear the bracket 192 is formed with a flange to receive and guide the ends of the bars, and also with a sleeve 195 which supports and guides an adjustable extension 196 of the bar 182. It will be seen that as the bar 182 is reciprocated, the grippers approach and withdraw from gripping position.

The end of the bar extension 196 carries a cam roller 198 which is forced by the spring 187 against the surface of the cam 200 which moves the grippers toward and from the ball at the required moments. It will be noted that cam 200 has an abrupt face 201 which secures the instantaneous withdrawal of the grippers. The cam 200 is secured to the upper end of the vertical shaft 202 supported in a stanchion formed as a part of the bracket supporting the shaft 14. The lower end of shaft 202 carries a bevel pinion 203 meshing with a second bevel gear 204 fixed to the driven member 62 of the clutch 50. The clutch member 50 is provided with four teeth (Fig. 7), but as the gear 204 is twice as large as the gear 203, a single escapement of the clutch 50 will rotate the shaft 202 and its cam 200 through 180° only, moving the grippers in one direction only as is required first to grip the ball and then to release it. As the second full operation of the grippers is for a moment only, two of the teeth on the clutch 50 will be released, causing the complete reciprocation of the grippers at that moment.

The covering and tamping operations

The above operations are performed while the applicators are in the horizontal position to which they are moved by the partial revolution of the shafts 121 and cranks 158 which have been described in connection with the loading operation. The position of the parts when this operation is being performed is shown in Fig. 8. When moved to the horizontal position, the tubes 124 are in alignment with two operating slides mounted on the front plate, and as these slides are similar, only one will be described. The one at the left appears in Fig. 5.

On the front plate 3 are mounted the parallel guideways 208 between which is moved the slide 209 having a lug 210 which carries the adjustable cone-headed pin 212 which enters the end of the tube 124 and moves it forwardly, a spring which is located within the tube returning the applicator when the slide is returned as is described in the former application.

Attached to the slide 209 is a link 214 which is pivoted to the crank disk 215 secured to the end of shaft 216 mounted in the bearing 218 on the rear face of the front plate. The shaft 216 is connected to the driven member of the clutch 53 (or 54). It will be noted that the clutch 53 has two teeth, so that if trigger 73 (or 74) is released momentarily, the shaft will revolve through 180°, advancing the applicator toward the ball or back to its original position. If, however, the escapement provided is released until both teeth have passed, the applicator will make a full stroke in one operation. This latter action takes place during the tamping and this operation for the applicators alternates, as will be described.

As the two applicators move forward simultaneously for their first stroke, they carry the two cover pieces toward the ball, but when the applicators strike the ball from opposite sides, they cannot move bodily any further because of a stop within the tube 124 fully described in the former application, and the continued movement of the slide is translated in the enfolding movement created by the independent movement of the cross heads 125 which, through the links 119, wrap the "hands" about the ball from opposite sides and stick the cemented surface of the cover to the cemented surface of the ball core. Due to the action of the timing mechanism, as will be described, the left hand applicator C' now withdraws, leaving the ball held by the right hand, and immediately returns to tamp the cover in place. It will be noted that the margin around the hand may tend to lift portions of the cover as the hand withdraws, but the return stroke will smooth down such irregularities and, in addition, the margin about the hand on the return stroke will dig into the cover and tend to spread it out, closing the space between the edges of the cover sections.

After the left "hand" has performed its tamping operation, the right hand makes its return stroke while the ball is held by the left. Both applicators now withdraw, freeing the ball, the grippers coming into play at this time to insure the release of the ball.

It will be noted here that the stroke imparted to the applicators during the loading operation is shorter than the stroke during the covering, the former not being sufficient to cause the "hand" to start a folding movement.

Timing mechanism

Each of the several triggers or escapements is controlled by a solenoid, all of which, except the solenoid for the trigger controlling the timing shaft, are energized by projection carrying disks mounted upon a single revolution timing shaft. As the main driving shaft is rotating constantly and as the several clutches are under compression by their respective springs at all times, the parts controlled by the several disks on the timing shaft act instantaneously upon the energizing of the respective solenoids.

The trigger or release for the timing shaft is the lever 75 (Fig. 7) which engages the single tooth on the driven member of the clutch 57 driven through the chain 43. This trigger 75 is pivoted at 222 on a hanger 223 suspended from the bed plate 1, the opposite end of the trigger being controlled by solenoid 225 which is energized by the hand-operated switch or push button 226. When the operator has inserted the two cover pieces in the loader plate 80 and placed the ball core on the rest 170, he momentarily presses the button 226 which releases the trigger 75 and the timing shaft starts its rotation immediately. When the button 226 is released, the trigger 75 reassumes its position and stops the timing shaft at the conclusion of one revolution which marks the complete cycle of the machine.

The timing shaft is indicated by the numeral 230, being mounted in brackets 231 rising from the bed plate and driven in the direction of the arrows in Figs. 14 to 22 by sprocket 232, carried by the shaft 227 fixed to the driven member of clutch 57, chain 233 and sprocket 234 on the timing shaft. The shaft 230 carries the several disks which are provided with raised points or arc-shaped lands, depending upon the period of actuation of each part controlled thereby. The timing shaft is screw-threaded and each disk is clamped between nuts 235. The solenoid energizing devices are the same in each case and a description of one will suffice.

Beneath each disk on the timing shaft is located the lever 236 pivoted on a bracket 237 rising from the bed plate and having a roller 238 held against the surface of the disk by a coil spring 240. On the outer end of each lever is an adjustable contact finger 241 which closes the spring switch 242 on the bed plate immediately below the end of the lever and holds it in closed position depending upon the arcuate extent of the projection. When the points or lands on the disk reach the roller 238, the circuit to the respective solenoid is closed and the appropriate trigger (or triggers) moved to release its clutch for operation. If the projection on the disk is a point only, the release will be momentary, but if a land of some extent is provided, the trigger affected will be released for a sufficient period to permit a longer rotation of the operating shaft controlled thereby.

Figure 14:
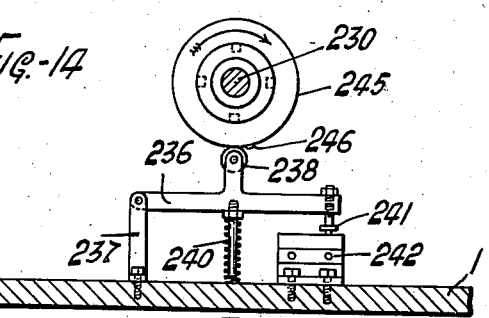
Figs. 14, 16, 18, 20 and 22 are side elevations of the various timing devices which control the sequence of operations of the various elements, being taken on the corresponding section lines of Fig. 2.
Figure 15:
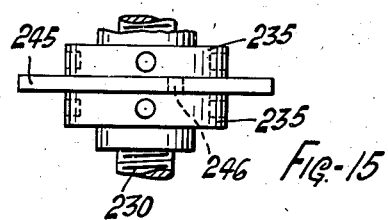
Figs. 15, 17, 19, 21 and 23 are enlarged plan views of the respective timing disks for each of the timing devices.

Figs. 14 and 15 show the timing disk 245 which controls the operation of loading the applicator. As this is a single operation in one complete cycle and as the clutch member controlled thereby has only one tooth, only a single point 246 is provided, and it will be observed that because it is the first operation to take place in the machine, this point is so placed as to act immediately after the starting button is depressed. The switch 242 thus makes a momentary contact and energizes the two solenoids which control the clutches 52 and 55. These are the solenoids 248 (Fig. 3) which actuate the levers 249 pivoted at 250 and connected at their opposite ends to the triggers 71 and 72.

Figure 16:
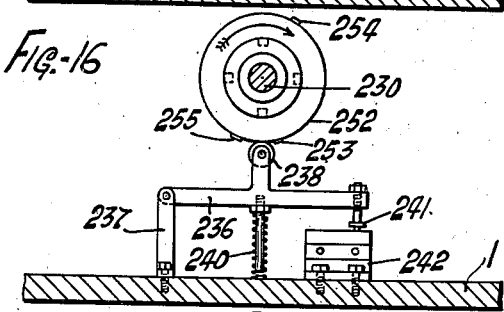
Figure 17:
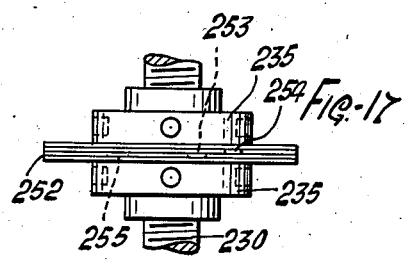

The next elements which operate in the cycle of the machine are the grippers 180 and 181 which are controlled by the disk 252 (Figs. 16 and 17). This is a multiple disk made up of several laminae, each carrying a point so that the laminae may be shifted to vary the timing if desired. The composite disk, which is held together by nuts 235, carries two points and a land. It will be recalled that the grippers move together to grip the ball, dwell, retreat to release the ball to the applicators, and then make a quick reciprocation to hold the ball the instant that the applicators withdraw. The first operation is controlled by the point 253 which is substantially contemporaneous with the point 246. This causes the grippers to approach the ball where they stay until the point 254 is brought into play, whereupon the grippers withdraw. The land 255 comes into action at the end of the cycle and, owing to its wider face, causes the full reciprocation of the grippers.

The switch 242 of this unit energizes the single solenoid 258 which actuates the trigger 68 controlling the clutch 50.

Figure 18:
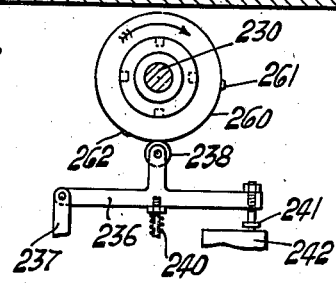
Figure 19:
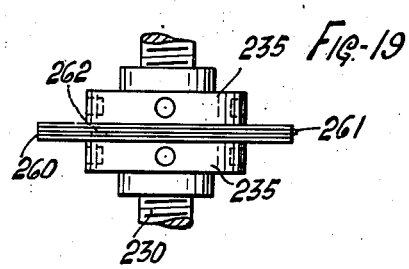

The next operation is the rotation of the applicators from loading to applying position, and this is controlled by the laminated disk 260 (Figs. 18 and 19). This operation takes place immediately after the loading and again after the completion of the applying and tamping operations, returning the applicators to horizontal position beneath the loading plate. The first of said operations is controlled by the point 261 and the second by the point 262. The switch for this disk energizes the two solenoids 264, one of which is shown in Fig. 6, this solenoid rocking the lever 265 pivoted at 266 to the bracket 267 and carrying the trigger 69 (or 70).

Figure 20:
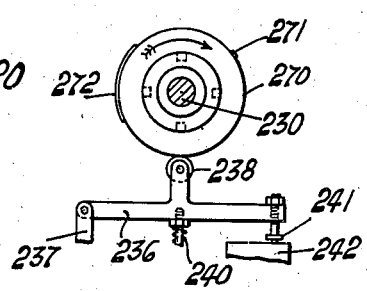
Figure 21:
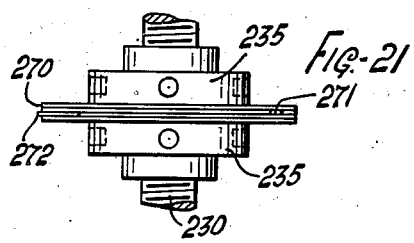
Figure 22:
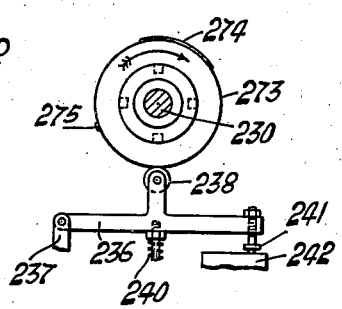
Figure 23:
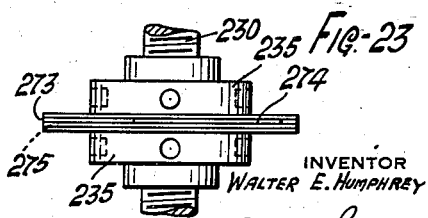

The laminated disk which controls the operation of the right hand applicator during the applying and tamping operations is shown in Figs. 20 and 21, and the one controlling the left hand applicator is shown in Figs. 22 and 23. It will be observed that the right hand disk 270 has a point 271 and a land 272, while the left hand disk 273 has a land 274 and then a point 275. This is because of the sequence of operations, the land on the disk 273 giving the full reciprocation to the left hand applicator while the point 271 moves the right hand applicator forward, whereas the land 272 causes the full reciprocation of the right hand applicator while the point 275 causes the withdrawal of the left hand applicator. It has been explained that if the trigger is depressed for a sufficient time interval, its clutch will remain active long enough to secure the full rotation required.

The disk 270 controls the solenoid 278 which, through the lever 279, actuates the trigger 74, while the disk 273 controls the solenoid 280 which, through the lever 281, actuates the trigger 73.

It will be recalled that the ball rest moves with the rotation of the applicators and requires no control mechanism.

Résumé

The operation of the machine will be reviewed briefly:

The operator places the two cover sections in the loader and the ball core on the ball rest and then presses the switch 226 located at some convenient point on the machine and the succeeding operations take place automatically.

The first operation is the raising of the "hands" to the loading plate and the lowering of the arms 90 which carry the cross heads 99 and the plungers 93. The rods 105 force the two cover pieces through their respective passages, condensing them until they are moved out of the loader plate into the pockets in the "hands." The plungers follow this operation and flatten the cover pieces, causing them to fit within the overhanging margins about the hands. The arms 90 then rise and the applicators carrying the cover pieces return to their lowered position.

While this has been happening, the grippers 180 and 181 move inwardly and grip the ball core. Then the applicators rotate into horizontal position, this action lowering the ball support 170. The applicators are then moved inwardly and go through their motions of applying and tamping the cover as has been described and then separate and return to their vertical position, restoring the ball rest to its position. Just as the applicators reach the ball core, the grippers withdraw and then reciprocate as the applicators leave the ball at the end of the operation.

This complete series of operations is believed to be wholly new, the machine is the first operative one for covering tennis balls automatically. The product is improved and the operations made more economical. The advantages have been set forth briefly, and as the invention is new and basic, the claims contained herein are entitled to a substantial range of equivalents covering any modifications or variations which embody the invention.

It is possible to utilize the cover condensing device without the ball covering features and, in such case, the advantages of a uniformly condensed cover section would be realized. In such cases the applicators would act as receivers and retainers for the cover and the plunger and the flexible rods 105 associated with it would act as a transfer device merely.

What is claimed is:

1. A machine for covering tennis balls or the like, comprising a ball core support, a flexible applicator of Cassinian outline, means to insert a preformed ball cover section in the applicator, and means to bring the applicator and the ball core into contact.

2. A machine for covering tennis balls or the like, comprising an applicator, a loading device, means to bring the applicator and the loading device into juxtaposition and to transfer a ball cover section from the loading device to the applicator, and means to bring the applicator and the ball core into contact.

3. A machine for covering tennis balls or the like, comprising an applicator, a loading device, means to bring the applicator and the loading device into juxtaposition and to transfer a ball cover section from the loading device to the applicator and to compress the cover section into the applicator, and mechanism to shift the applicator from the loading device into contact with a ball core.

4. A machine for covering tennis balls or the like, comprising a loading plate having a passage, an applicator for applying the cover section to a ball core, means to hold the applicator adjacent the discharge end of the passage, and a transfer device movable through the passage to force a cover section through the passage and onto the applicator.

5. A machine for covering tennis balls or the like, comprising a loading plate having a tapered passage, an applicator for applying the cover section to a ball core, means to hold the applicator adjacent the discharge end of the passage, and a transfer device movable through the passage to force a cover section through the tapered passage, condense the same and eject the condensed cover section into the applicator.

6. A machine for covering tennis balls or the like, comprising a plate having a passage for a ball cover section and a reduced outlet opening, a reciprocating member movable through the passage and having means to force the cover section through the passage, means to receive the cover section and to hold it in condensed condition, and means to apply the condensed cover section to a ball core.

7. A machine for covering tennis balls or the like, comprising a plate having a passage for a ball cover section, said passage being tapered to a discharge opening less in area than the cover section, a plunger, a device carried by the plunger and adapted to press against the cover section and force it through the tapered passage, a receiver for the cover section having a pocket therein to hold the condensed cover section after it issues from the passage, and means to apply the cover section to a ball core while held in the pocket of the receiver.

8. A machine for covering tennis balls or the like, comprising a plate having a passage with a receiving opening for a ball cover section, said passage being tapered to a discharge opening less in area than the cover section, a plunger movable through the passage, a device carried by the plunger and adapted to press against the cover section and force it through the tapered passage, and a receiver for the cover section having a pocket therein to hold the condensed cover section after it issues from the passage, the plunger pressing against the cover section at the end of its travel to flatten it within the receiver.

9. A machine for covering tennis balls or the like, comprising a sectional articulated applicator, means to condense a cover section and deposit it while in condensed condition on the face of the applicator, and means to flex the applicator around a ball core.

10. A machine for covering tennis balls or the like, comprising a sectional articulated applicator, means to deposit a ball cover section on the applicator, and means to flex the applicator about a ball core.

11. A machine for covering tennis balls or the like, comprising a plate having a passage the entrance to which is similar to the free cover section but tapered to a discharge opening of reduced area, an applicator, means to move the applicator to a position at the discharge opening, the applicator having a pocket less in area than the free cover section, and a series of flexible rods movable along the wall of the passage while contacting the edge of the cover section to force the section through the passage and into the pocket in the applicator.

12. A machine for covering tennis balls or the like, comprising a plate having a passage the entrance to which is similar to the free cover section but tapered to a discharge opening of reduced area, an applicator, means to move the applicator to a position at the discharge opening, the applicator having a pocket less in area than the free cover section, a series of flexible rods movable along the wall of the passage while contacting the edge of the cover section to force the section through the passage and into the pocket in the applicator, and a plunger to press the center of the cover section into the pocket.

13. A machine for covering tennis balls or the like, comprising a plate having a passage the entrance to which is similar to the free cover section but tapered to a discharge opening of reduced area, an applicator, means to move the applicator to a position at the discharge opening, the applicator having a pocket less in area than the free cover section, a series of flexible rods movable along the wall of the passage while contacting the edge of the cover section to force the section through the passage and into the pocket in the applicator, and a plunger movable with the rods and adapted at the end of its stroke to press the center of the cover section into the pocket while the rods are in contact with the edge thereof.

14. In a machine for the purposes set forth, a loading plate having a passage for a cover section, an applicator at the discharge of said passage, a marginal wall about the applicator to form a pocket, means to move the cover section through the passage and into the pocket on the applicator comprising a device to bear against the edge of the cover section while it is moved through the passage, and means to move the applicator to a position adjacent a ball core.

15. In a machine for the purposes set forth, a loading plate having a passage for a cover section, an applicator at the discharge of said passage, a marginal wall about the applicator to form a pocket, means to move the cover section through the passage and into the pocket on the applicator comprising a device to bear against the edge of the cover section while it is moved through the passage, a plunger movable into pressing relation to the center of the cover section while in the pocket, and means to move the applicator to a position adjacent a ball core.

16. In a machine for the purposes set forth, a loading plate having a passage for a cover section, said passage being tapered to a discharge opening of less area than the free cover section, an applicator at the discharge of said passage, a marginal wall about the applicator to form a pocket, means to move the cover section through the passage and into the pocket on the applicator comprising a device to bear against the edge of the cover section while it is moved through the passage, and means to move the applicator to a position adjacent a ball core.

17. In a machine for the purposes set forth, a loading plate having a passage for a cover section, said passage being tapered to a discharge opening of less area than the free cover section, an applicator at the discharge of said passage, a marginal wall about the applicator to form a pocket, means to move the cover section through the passage and into the pocket on the applicator comprising a device to bear against the edge of the cover section while it is moved through the passage, a plunger movable into pressing relation to the center of the cover section while in the pocket, and means to move the applicator to a position adjacent a ball core.

18. A machine for covering tennis balls, comprising a ball core support, flexible applicators on opposite sides of the support, loading devices for inserting cover sections in the applicators, and means for moving the applicators from positions adjacent the loading devices to positions surrounding the ball core.

19. A machine for covering tennis balls, comprising a ball core support, flexible applicators on opposite sides of the support, loading devices for placing cover sections in the applicators, and means for moving the applicators between the loading devices and the ball core and wrapping the applicators about the ball core.

20. A machine for covering tennis balls, comprising a ball core support, flexible applicators on opposite sides of the support, loading devices having means for compressing cover sections and fitting them in the applicators, and means for moving the applicators between the loading devices and the ball core and wrapping the applicators about the ball core.

21. A machine for covering tennis balls, comprising means to grip a ball core at opposite points, flexible applicators to wrap about the core and apply the cover sections thereto, and means to release the grippers as the applicators encircle the ball core.

22. A machine for covering tennis balls, comprising means to grip a ball core at opposite points, flexible applicators to wrap about the core and apply the cover sections thereto, and means to release the grippers as the applicators encircle the ball core and to return the grippers to the ball as the applicators open at the conclusion of the covering operation.

23. In a machine for covering tennis balls, means to hold a ball core, flexible applicators on opposite sides of the ball core, a loading plate for each applicator, means to move and hold the applicators into receiving relation to the loading plates while in flattened condition, means to move cover sections through the plates and into the applicators, and means to transfer the applicators from loading position to positions on opposite sides of the ball core and to wrap the applicators about the ball core.

24. In a machine for covering tennis balls, means to hold a ball core, flexible applicators on opposite sides of the ball core, a loading plate for each applicator, means to move and hold the applicators into receiving relation to the loading plates while in flattened condition, means to condense a cover section and insert it while in condensed condition in each applicator, and means to transfer the applicators from loading position to positions on opposite sides of the ball core and to wrap the applicators about the ball core.

25. A device for uniformly condensing a tennis ball cover section, comprising a plate having a passage of the shape of a section but tapered to an area less than the free section, a series of flexible rods arranged about the edge of the section, a receiver at the reduced end of the passage, and means to move the rods through the passage while in contact with the wall thereof.

26. A device for uniformly condensing a tennis ball cover section, comprising a plate having a passage of the shape of a section but tapered to an area less than the free section, a series of flexible rods arranged about the edge of the section, a receiver at the reduced end of the passage, means to move the rods through the passage while in contact with the wall thereof, and a plunger located centrally of the passage and movable to press the center of the section after it is moved into the receiver by the rods.

27. A device for uniformly condensing a tennis ball cover section, comprising a plate having a passage corresponding to the cover section but tapered to a reduced discharge opening, a series of spaced rods arranged about the edge of the section, a receiver at the reduced end of the passage having a marginal wall, and means to move the rods through the passage to force the cover section into the space enclosed by the wall on the receiver.

28. A device for uniformly condensing a tennis ball cover section, comprising a plate having a passage corresponding to the cover section but tapered to a reduced discharge opening, a series of spaced rods arranged about the edge of the section, a receiver at the reduced end of the passage having a marginal wall, means to move the rods through the passage to force the cover section into the space enclosed by the wall on the receiver, and a plunger movable through the passage to flatten the center of the cover section while on the receiver.

29. A device for uniformly condensing a tennis ball cover section, comprising a plate having a passage corresponding to the cover section but tapered to a reduced discharge opening, a sectional articulated applicator at the discharge opening, means to force the cover section through the tapered passage and into the applicator, and a plunger conforming to the contour of the applicator and operative to press the center of the cover section against the applicator.

30. A device for uniformly condensing a tennis ball cover section, comprising a plate having a passage corresponding to the cover section but tapered to a reduced discharge opening, a sectional articulated applicator at the discharge opening having a marginal wall defining a section receiving pocket, means to force the cover section through the tapered passage and into the pocket on the applicator, and a plunger conforming to the contour of the applicator and operative to press the center of the cover section into the pocket.

31. A device for uniformly condensing a tennis ball cover section, comprising a plate having a passage corresponding to the cover section but tapered to a reduced discharge opening, a sectional articulated applicator at the discharge opening, a plurality of spaced rods the ends of which bear against the cover section and are movable through the passage to force the cover section through the tapered passage and into the applicator, and a plunger conforming to the contour of the applicator and operative to press the center of the cover section against the applicator.

32. A device for uniformly condensing a tennis ball cover section, comprising a plate having a passage corresponding to the cover section but tapered to a reduced discharge opening, a sectional articulated applicator at the discharge opening having a marginal wall defining a section receiving pocket, a plurality of spaced rods the ends of which bear against the cover section and are movable through the passage to force the cover section through the tapered passage and into the pocket on the applicator, and a plunger conforming to the contour of the applicator and operative to press the center of the cover section into the pocket.

33. A device for uniformly condensing a tennis ball cover section comprising a plate having a passage of the shape of the section but tapered to a discharge opening having an area less than the free section, and a device movable through the passage and constructed and adapted to force the cover section through the passage.

34. A device for uniformly condensing a tennis ball cover section comprising a plate having a passage of the shape of the section but tapered to a discharge opening having an area less than the free section and a plurality of flexible members movable through the passage to force the cover section through the passage while permitting it to contract to an area equal to the discharge opening.

35. A device for uniformly condensing a tennis ball cover section comprising a plate having a passage of the shape of the section but tapered to a discharge opening having an area less than the free section, grooves in the wall of the passage and a plurality of flexible members partially received in the grooves and means to move the flexible members through the passage.

36. In a machine for the covering of ball cores with a cover composed of sections of Cassinian outline, a member having a passage of corresponding outline, a plunger, and means to move the plunger through the passage to move a cover section through the passage, and means located at the discharge end of the passage to receive the cover section and to apply it to a ball core.

37. In a machine for the covering of ball cores with a cover composed of sections of Cassinian outline, a plate having a transverse passage of corresponding outline, a plunger of substantially Cassinian outline, and means to move the plunger through said passage to propel a cover section through the passage, and means located at the discharge end of the passage to receive the cover section and to apply it to a ball core.

38. In a machine for the covering of ball cores with a cover composed of sections of Cassinian outline, a plate having a transverse passage of corresponding outline, and a member movable through said passage to propel a cover section through the passage, said member having a plurality of flexible arms to contact the cover section.

39. In a ball covering device, a plate having a transverse passage of Cassinian outline, a plunger, and means to move the plunger through said passage, and means located at the discharge end of the passage to receive the cover section and to apply it to a ball core.

40. In a ball covering device, a plate having a transverse passage of Cassinian outline, and a plunger movable through said passage, said plunger comprising a plurality of flexible members.

41. In a ball covering device, a plate having a transverse passage of Cassinian outline, grooves formed in the wall of said passage, and a plunger movable through the passage and having a plurality of flexible members guided in the grooves.

42. In a ball covering device, a plate having a transverse passage of Cassinian outline, a plunger movable through said passage, said plunger comprising a plurality of flexible members, and means to reciprocate the plunger through the passage.

43. In a ball covering device, a plate having a transverse passage of Cassinian outline, grooves formed in the wall of said passage, a plunger movable through the passage and having a plurality of flexible members guided in the grooves, and means to reciprocate the plunger through the passage.

WALTER E. HUMPHREY.